Feb. 27, 1951 — H. GOLDBERG ET AL — 2,543,364
CUTTER BAR FOR LAWN MOWERS AND THE LIKE
Filed Dec. 13, 1947 — 2 Sheets-Sheet 1
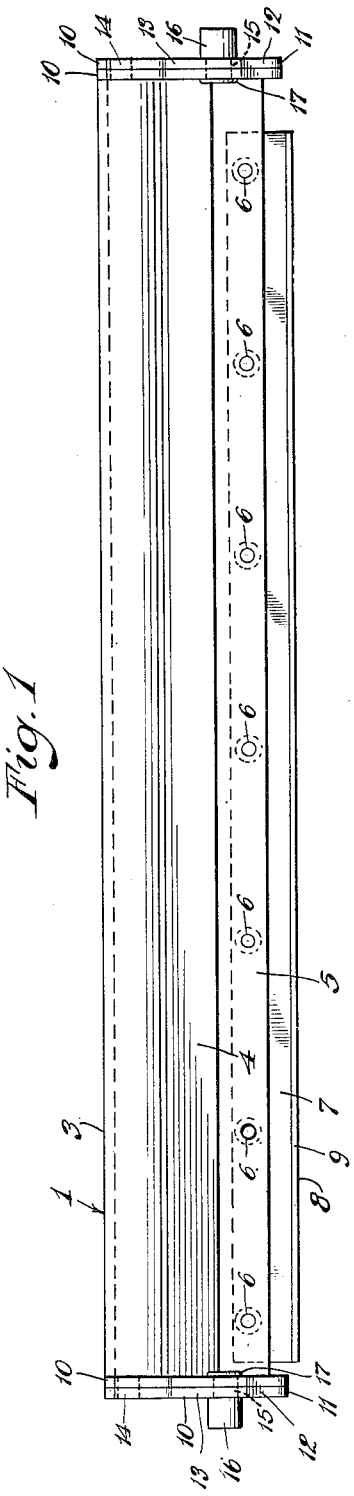
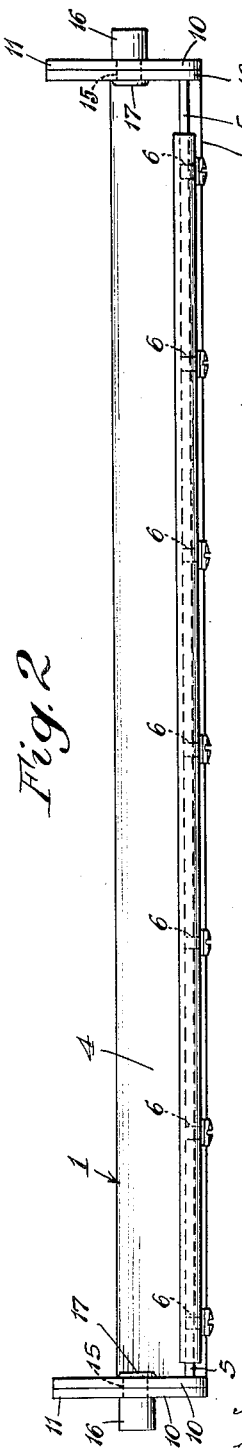
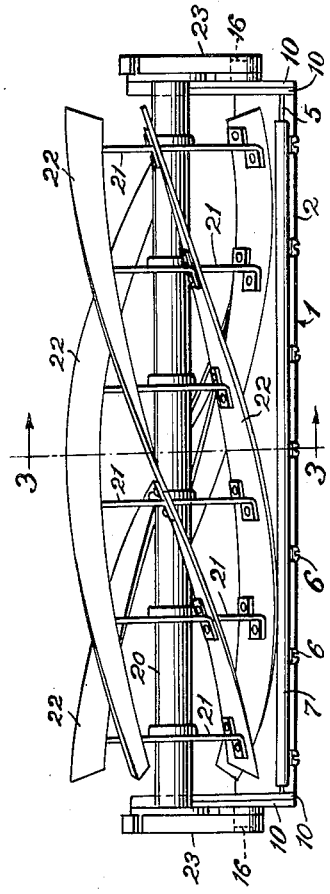
Inventors
Harry Goldberg
Milford D. Burrows
by Parker & Carter
Attorneys

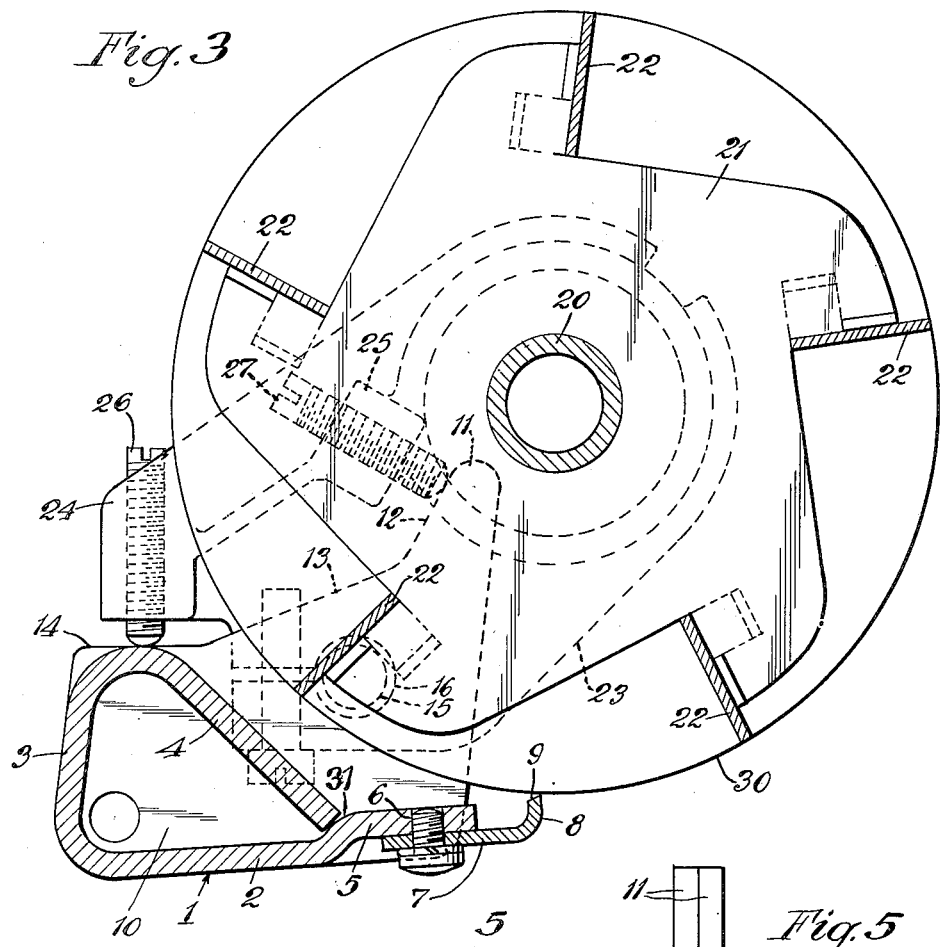
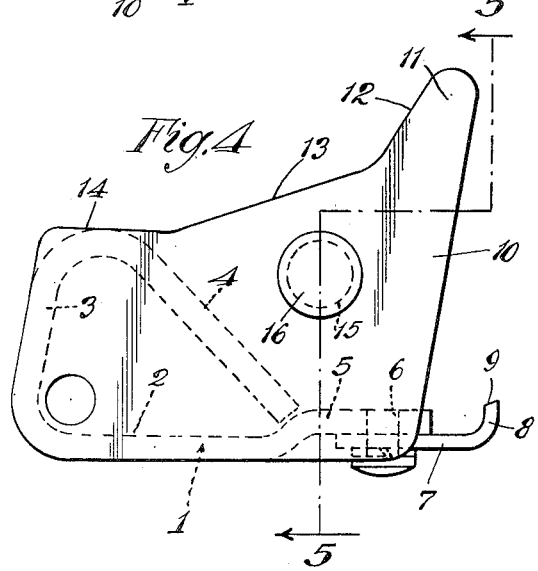
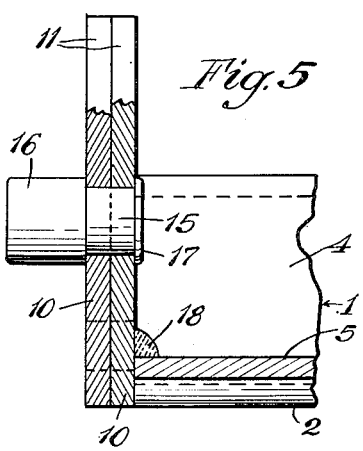

Patented Feb. 27, 1951

2,543,364

UNITED STATES PATENT OFFICE 2,543,364

CUTTER BAR FOR LAWN MOWERS AND THE LIKE

Harry Goldberg and Milford D. Burrows, Chicago, Ill., assignors to Pioneer Gen-E-Motor Corporation, Chicago, Ill., a corporation of Delaware Application December 13, 1947, Serial No. 791,548

8 Claims. (Cl. 56—289)

This invention relates to an improvement in cutter bars such as are used, for example, with lawn mowers.

One purpose is to provide a cutter bar of maximum strength.

Another purpose is to provide a cutter bar of maximum strength and lightness.

Another purpose is to simplify and economize the manufacture of such cutter bars.

Another purpose is to provide a cutter bar which maintains a cutter edge of maximum rigidity and trueness.

Another purpose is to provide a cutter bar, the major structural element of which is formed of a single piece of sheet metal.

Other purposes will appear from time to time in the course of the specification and claims.

The invention is illustrated more or less diagrammatically in the accompanying drawings wherein:

Fig. 1 is a plan view of the cutter bar;

Fig. 2 is a front elevation of the cutter bar;

Fig. 3 is a vertical section on the line 3—3 of Figure 6 substantially illustrating on an enlarged scale the cutter bar and parts of a lawn mower to which it is applied;

Fig. 4 is an end view of the cutter bar; and

Fig. 5 is a section on the line 5—5 of Fig. 4.

Figure 6 is an elevation of a lawn mower equipped with the cutter bar of the present invention.

Like parts are indicated by like symbols throughout the specification and drawings.

Referring to the drawings, 1 generally indicates a cutter bar plate, shown as having a bottom portion 2, a rear portion 3 and a front portion 4. The bottom portion 2 extends forwardly of the lower edge of the front portion 4, the three portions being bent to form a generally triangular member or strut. The bottom portion 2 extends substantially forwardly of the lower forward edge of the portion 4, as at 5, and is apertured as at 6 to receive any suitable rivets or connecting means whereby a cutter blade 7 is secured in place. The cutter blade 7 has its forward edge upwardly curved as at 8, and terminates in a beveled or offset top cutting surface 9. The bottom portion 2 is upwardly bent adjacent the lower forward edge of the portion 4 to form the shoulder 31 adapted to be held by said lower forward edge of the portion 4 when the forward extension 5 of the bottom portion 2 is upwardly urged.

At each end of the bar thus formed is an end plate or plates 10. It will be understood that a double thickness of metal may be employed, if desired. The plate structure has an upwardly and forwardly extending horn 11 which has an upper, rear surface or edge 12 which merges into or connects an intermedially inclined surface 13. This surface merges or connects, in turn, with a lower rear surface 14, shown as generally horizontal. The two plates may be connected together by what is in offset a rivet 15 headed as at 16 and upset as at 17. The head 16 is in the form of a cylindrical bearing member, whereby the cutter bar structure, as a whole, may be pivotally secured to any suitable lawn mower base or structure. The end plates 10 may be welded or otherwise suitably secured to the ends of the cutter bar structure. For example, welding is shown at 18 in Fig. 5.

It will be understood that the above described cutter bar structure may be employed with a wide variety of mowers, and that the details of the mowers do not, of themselves, form part of the present invention.

In Fig. 3 we have illustrated, in vertical section, an assembled structure in which 20 is the hollow tubular portion of a lawn mower reel. It is provided with a plurality of spiders 21, upon which any suitable spiraled knives 22 may be secured. 23 somewhat diagrammatically indicates a supporting end plate having thickened end portions 24 and 25 in which are threaded adjusting screws 26 and 27, the ends of which abut against the edges 12 and 14 of the end plates 10, as is clearly shown in Fig. 3. It will be understood that the cutter bar end plates are suitably pivoted or journaled in or to the supporting end plate 23 of the lawn mower assembly, as by the cylindrical heads 16. It will be understood that the screws 26 and 27 may be set, and may be varied in their setting, to set the cutter bar structure in relation to the periphery or cutting path 30 of the cutter knives 22.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

In the operation of our device, the above described cutter bar structure is journaled in any suitable lawn mower side plates or end members 23, which may also serve to carry or support the cutter reel itself. The cutting edge 9 of the blade 7 may be adjusted in relation to the cutting path 30 of the knives 22 by proper adjustment or setting of the screws 26 and 27. The result is an accurate and easily supported cutter bar with a blade portion which is true and rectilinear, and which is properly related to the axis passing through the studs or heads 16. The screw structure shown permits a very accurate but easy and quick adjustment of the cutter bar blade upward and away from the path of the cutting edges of the knives 22 on the reel.

The structure is simple and inexpensive to manufacture and is sturdy and strong, with the minimum number of points or areas where weakness can develop.

We claim:

1. In a cutter bar for lawn mowers and the like, a formed steel cutter bar having a body of sheet metal, said body including integral upper, rear and lower elements, said upper element being downwardly bent with its edge approaching the top of the lower element, said lower element extending forwardly beyond the closest approach to it of said upper element in such angular relation thereto that upward pressure on said forwardly extending portions will be ineffective to cause upward movement of said upper element, a cutter blade secured to the forwardly extending portion of said lower element beyond said point of closest approach, and end plates secured to each end of the cutter bar.

2. The structure of claim 1 characterized by and including end plates welded to the end of said cutter bar.

3. The structure of claim 1 characterized by and including end plates for the cutter bar, each of which has a pivot member outwardly extending therefrom in a plane parallel with said cutter bar.

4. The structure of claim 1 characterized by and including end plates for the cutter bar, each end plate having a rivet element passing therethrough and connecting the plates, said rivet element having an outwardly extending generally cylindrical head portion.

5. In a cutter bar structure for lawn mowers and the like, a formed steel cutter bar having a body of sheet metal, said body including upper, rear and lower elements, said upper element extending downwardly from the upper portion of the rear element, with its free edge approaching the top of the lower element substantially inwardly of the free edge of the lower element, the lower element being upwardly offset to form a shoulder aligned with the free edge of the upper element, the edge portion of the lower element which extends beyond said shoulder being formed and adapted to receive a cutter blade, and end plates secured to each end of the cutter bar, and to the edges of said upper rear and lower elements, said end plates having outwardly extending bearing studs.

6. The structure of claim 5 characterized by and including end plates each having a forward upwardly extending integral lever portion.

7. The structure of claim 5 characterized by and including a cutter blade secured to the lower surface of the lower element forwardly of the shoulder of said lower element, said cutter blade including a body portion and an upwardly turned angular edge portion.

8. The structure of claim 5 characterized by and including individual end plates of the same thickness as said cutter bar.

HARRY GOLDBERG.
MILFORD D. BURROWS.

REFERENCES CITED

The following references are of record in the file of this patent:

UNITED STATES PATENTS

| Number | Name | Date |
|---|---|---|
| 1,724,879 | Kachel | Aug. 13, 1929 |
| 1,803,302 | Hessenbruch | Apr. 28, 1931 |
| 2,183,545 | Clemson | Dec. 19, 1939 |
| 2,425,106 | Madsen | Aug. 5, 1947 |